United States Patent
Tippetts et al.

(10) Patent No.: US 9,317,923 B2
(45) Date of Patent: Apr. 19, 2016

(54) STEREO VISION APPARATUS AND METHOD

(71) Applicant: Brigham Young University, Provo, UT (US)

(72) Inventors: Beau Jeffrey Tippetts, Provo, UT (US); Dah-Jye Lee, American Fork, UT (US)

(73) Assignee: Brigham Young University, Provo, UT (US)

( * ) Notice: Subject to any disclaimer, the term of this patent is extended or adjusted under 35 U.S.C. 154(b) by 38 days.

(21) Appl. No.: 13/857,868

(22) Filed: Apr. 5, 2013

(65) Prior Publication Data
US 2013/0266211 A1     Oct. 10, 2013

Related U.S. Application Data

(60) Provisional application No. 61/686,518, filed on Apr. 6, 2012, provisional application No. 61/807,526, filed on Apr. 2, 2013.

(51) Int. Cl.
*G06T 7/00* (2006.01)

(52) U.S. Cl.
CPC ............ *G06T 7/0051* (2013.01); *G06T 7/0075* (2013.01); *G06T 2207/10012* (2013.01)

(58) Field of Classification Search
None
See application file for complete search history.

(56) References Cited

U.S. PATENT DOCUMENTS

| | | | | | |
|---|---|---|---|---|---|
| 4,695,156 | A | * | 9/1987 | Taft | G01S 11/12 348/139 |
| 5,109,425 | A | * | 4/1992 | Lawton | G06T 7/0071 348/25 |
| 5,179,441 | A | * | 1/1993 | Anderson | G06K 9/32 348/43 |
| 5,581,625 | A | * | 12/1996 | Connell | G06K 9/00778 348/139 |
| 6,078,701 | A | * | 6/2000 | Hsu | G06K 9/32 375/E7.086 |
| 6,831,677 | B2 | * | 12/2004 | Peleg | G06T 3/4038 348/36 |
| 2002/0012004 | A1 | * | 1/2002 | Deering | G06T 3/0081 345/589 |
| 2002/0191083 | A1 | * | 12/2002 | Akiyoshi | G06T 7/2033 348/222.1 |
| 2004/0223640 | A1 | * | 11/2004 | Bovyrin | G06K 9/32 382/154 |
| 2008/0136900 | A1 | * | 6/2008 | Grasnick | H04N 13/0404 348/51 |
| 2009/0123030 | A1 | * | 5/2009 | De La Barre | H04N 13/0409 382/103 |
| 2010/0007720 | A1 | * | 1/2010 | Murali | G06T 7/0022 348/47 |
| 2012/0321172 | A1 | * | 12/2012 | Jachalsky | G06T 7/0075 382/154 |

FOREIGN PATENT DOCUMENTS

| | | | | | |
|---|---|---|---|---|---|
| EP | 2466901 A2 | * | 5/2011 | | H04N 13/00 |
| EP | 2466901 A2 | * | 6/2012 | | |
| TR | EP2466901 A2 | * | 5/2011 | | H04N 13/00 |
| TR | EP 2466901 A2 | * | 6/2012 | | H04N 13/0022 |

* cited by examiner

*Primary Examiner* — Matthew Bella
*Assistant Examiner* — Soo Shin
(74) *Attorney, Agent, or Firm* — Kunzler Law Group

(57) ABSTRACT

A method for stereo vision may include filtering a row or column in a stereo image to obtain intensity profiles, identifying peaks in the intensity profiles, pairing peaks within a maximum disparity distance, determining a shape interval for peak pairs, selecting a peak pair with a maximum shape interval, determining a disparity offset for the peak pairs, extending shape intervals to include all pixels in the intensity profiles, computing depths or distances from disparity offsets, and smoothing the stereo image disparity map along a perpendicular dimension. Another method for stereo vision includes filtering stereo images to intensity profiles, identifying peaks in the intensity profiles, pairing peaks within a maximum disparity distance, determining shape intervals for peak pairs, and selecting peak pairs with the maximum shape interval. Apparatus corresponding to the above methods are also disclosed herein.

17 Claims, 7 Drawing Sheets

STEREO VISION APPARATUS AND METHOD

REFERENCE TO RELATED APPLICATIONS

This application claims priority to U.S. Provisional Application No. 61/686,518 entitled "Dense Disparity Real-time Stereo Vision Algorithm for Resource Limited Systems" and filed on 6 Apr. 2012 for Tippetts et al. and to U.S. Provisional Application No. 61/807,526 entitled "Stereo Vision for Resource Limited Systems" and filed on 2 Apr. 2013 for Tippetts et al. Each of the foregoing Applications are incorporated herein by reference in their entirety.

BACKGROUND OF THE INVENTION

1. Field of the Invention

The claimed invention relates to image processing systems in general, and to stereo vision processing systems, apparatus, and methods in particular.

2. Description of the Related Art

The field of stereo vision has received a great deal of attention over the past decade. New algorithms have been developed, and existing algorithms have been augmented and tuned in efforts to both produce more accurate results and obtain them faster. The nature of the stereo vision problem makes these two endeavors non-trivial. The accuracy of results is affected by missing information such as that caused by occlusions, slanted surfaces, and other issues relating to extracting information about three dimensions from two dimensional images. The number of pixels that each image contains increases the number of calculations required to match it with any number of possible matches, making the correspondence problem a computationally complex one that severely limits the speed at which one can obtain results.

Most of the time, accuracy and speed are pitted against each other, making it more difficult to obtain more of both at the same time. Although much of the academic literature does not address the tradeoff between accuracy and speed, many stereo vision applications are sensitive to that tradeoff.

In most circumstances, determining an acceptable tradeoff between speed and accuracy is dependent upon the target application. Although many applications have existed for some time, more and more applications are being developed that could benefit from real-time three-dimensional information. Image sensors and processing hardware are becoming more prevalent, especially because they are available as lightweight, low-power, passive devices. Basic low-quality image sensors can be found on systems from cell phones to entertainment game consoles to security systems to high-tech micro unmanned aerial vehicles. Each of these systems may have limited computational resources for several possible reasons, including constraints on weight, size, power, and cost, or perhaps a requirement that the bulk of computing resources be dedicated to a different primary task.

Accordingly, what is needed is apparatus and methods for stereo vision that provide high levels of speed and accuracy, and can be deployed in resource-limited systems.

BRIEF SUMMARY OF THE INVENTION

The present invention has been developed in response to the present state of the art, and in particular, in response to the problems and needs in the art that have not yet been fully solved by currently available stereo vision systems, apparatus, and methods. Accordingly, the claimed inventions have been developed to provide a stereo vision apparatus, method, and system that overcome shortcomings in the art.

As detailed herein, a method for stereo vision may include filtering a row or column in left and right images of a stereo image to obtain left and right intensity profiles for the row or column, identifying left and right peaks in the intensity profiles, pairing left and right peaks within a maximum disparity distance, determining a shape interval for each peak pair, selecting a peak pair with a maximum shape interval, determining a disparity offset for the peak pairs, extending shape intervals until all pixels in the intensity profiles reside within a shape interval, computing depths or distances from disparity offsets, and smoothing the stereo image disparity map along a perpendicular dimension.

Another method for stereo vision includes filtering a row or column in left and right stereo images to provide left and right intensity profiles for the row or column, identifying peaks in the intensity profiles, pairing peaks within a maximum disparity distance, determining shape intervals for peak pairs, and selecting peak pairs with the maximum shape interval.

Apparatus corresponding to the above methods are also disclosed herein. It should be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
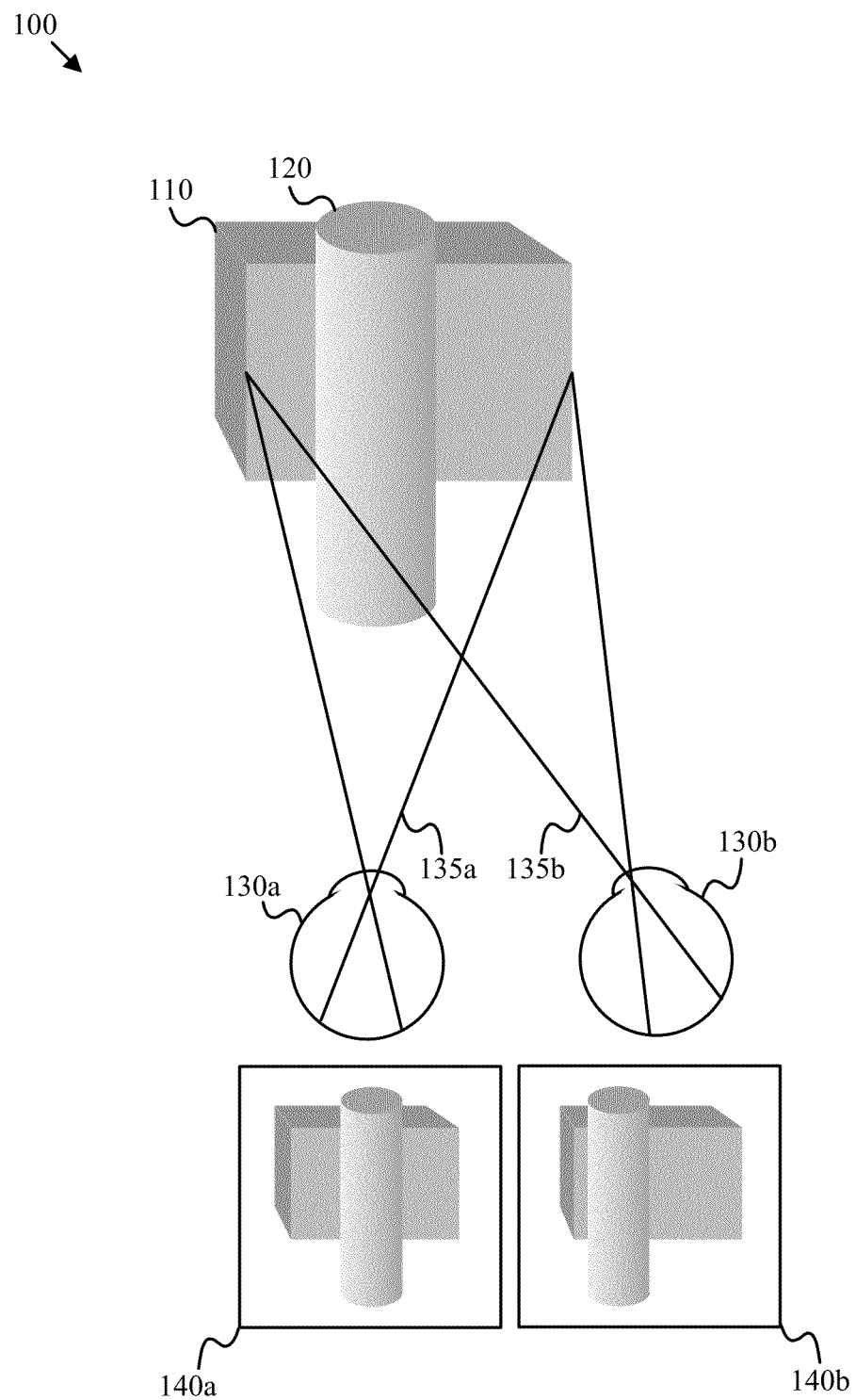
FIG. 1 is a block diagram depicting stereo image disparity as referenced by the claimed invention and related art.

Some of the functional units described in this specification have been labeled as modules, in order to more particularly emphasize their implementation independence. Others are assumed to be modules. For example, a module or similar unit of functionality may be implemented as a hardware circuit comprising custom VLSI circuits or gate arrays, off-the-shelf semiconductors such as logic chips, transistors, or other discrete components. A module may also be implemented with programmable hardware devices such as field programmable gate arrays, programmable array logic, programmable logic devices or the like.

A module or a set of modules may also be implemented (in whole or in part) as a processor configured with software to perform the specified functionality. For example, modules may be implemented as one or more servers configured to provide one or more services.

An identified module may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, the executable code of a module may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any tangible form capable of enabling execution of a program of machine-readable instructions on a digital processing apparatus. For example, a computer readable medium may be embodied by a flash drive, compact disk, digital-video disk, a magnetic tape, a Bernoulli drive, a magnetic disk, a punch card, flash memory, integrated circuits, or other digital processing apparatus memory device. A digital processing apparatus such as a computer may store program codes, associated data, and the like on the computer readable medium that when retrieved enable the digital processing apparatus to execute the functionality specified by the modules.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram depicting stereo image disparity as referenced by the claimed invention and related art. The stereo image disparity diagram includes a background object 110, a foreground object 120, stereo image receptors 130*a* and 130*b*, visual field markers 135*a* and 135*b*, a left image 140*a*, and a right image 140*b*. The stereo image receptors 130*a* and 130*b* are depicted as eyes, but may be any pair of image sensors, such as optical cameras, charged-coupled device (CCD) image sensors, active pixel sensors, or the like. Due to the distance separating the pair of stereo image receptors, a foreground object appears to be shifted to the left, relative to a background object in the right image and to the right relative to a background object in the left image. When the two images are compared, the areas of the two images that differ from each other due to stereo image disparity are referred to as disparity regions.

Figure 2:
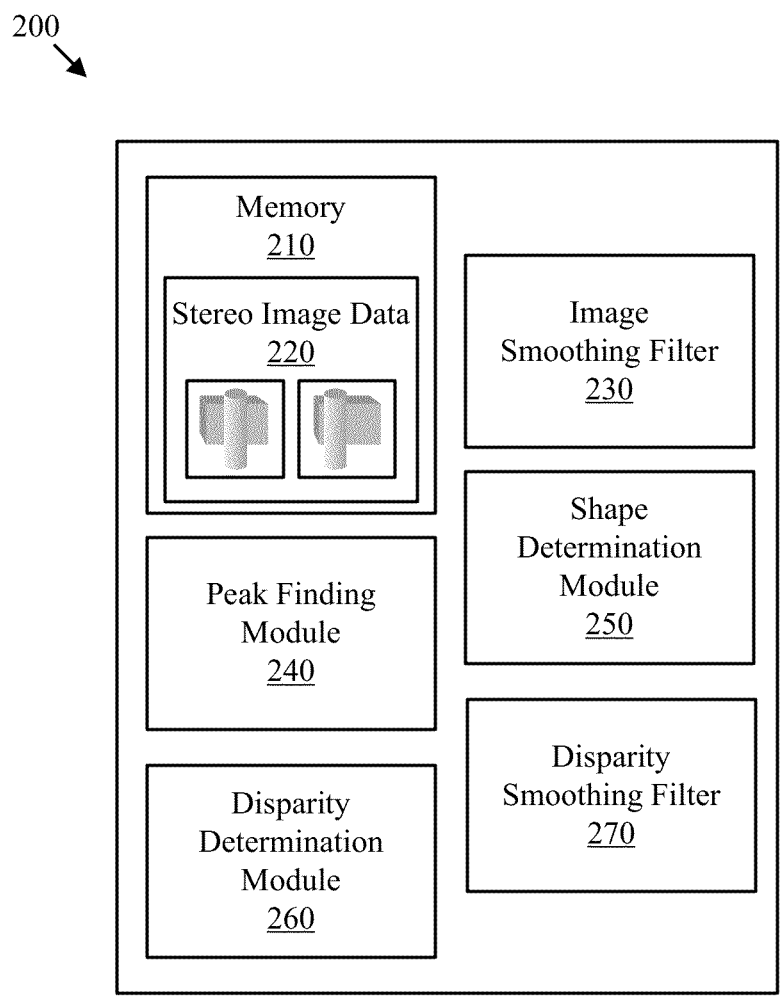
FIG. 2 is a block diagram of one example of a stereo vision apparatus that is consistent with one or more embodiments of the claimed invention.

FIG. 2 is a block diagram of one example of a stereo vision apparatus that is consistent with one or more embodiments of the claimed invention. As depicted, the stereo vision apparatus 200 includes a variety of modules including a memory 210, an image smoothing filter 230, a peak finding module 240, a shape determination module 250, a disparity determination module 260, and a disparity smoothing filter 270. The stereo vision apparatus 200 is configured to provide fast and accurate stereo image processing, even when implemented in resource-limited systems.

Each of the depicted modules may reside on a single computing device (i.e. node) or be collaboratively partitioned onto multiple devices or nodes. The modules may be primarily or wholly comprised of software codes and associated data that are executed and processed by a digital processing apparatus such as a device, computer or server to provide the specified functionality.

The memory 210 is configured to store a stereo image comprising left and right images of a scene, for processing by the various modules of the stereo vision apparatus 200. The memory 210 may take different forms in various embodiments, such as a disk drive in a computer, flash memory in a camera, or volatile memory in a dedicated image processing device.

The image smoothing filter 230 filters rows or columns in the left and right images of the stereo image to provide left and right intensity profiles for an image dimension of the corresponding row or column. In various embodiments, the image smoothing filter 230 may iteratively filter each row or column of the stereo image, or filter multiple rows or columns in parallel. In various embodiments, the image smoothing filter 230 may employ well-known image processing filters such as a pillbox filter, square filter, Gaussian kernel, or the like. Smoothing the intensity profiles reduces noise and increases shape matching accuracy.

The peak finding module 240 identifies peaks in the left and right intensity profiles. Peaks are local maxima in each of the left and right intensity profiles, and as such may be identified using such criteria as a first derivative test.

The shape determination module 250 pairs identified left and right shape intervals with a maximum overlap (or maximum disparity range) to provide paired shape intervals for the row or column. The paired shape intervals correspond to a shape in the stereo image. In one embodiment, the shape determination module 250 starts by comparing the paired peaks of the most prominent shape in the images—that is, the peaks with the largest intensity values. Once shapes are matched, they are not compared to other shapes within the disparity range in subsequent iterations, and pixels included in a shape are excluded from subsequent iterations. Excluding the pixels included in shapes from subsequent iterations significantly reduces the processing time required.

The disparity determination module 260 determines a disparity offset for each paired shape interval by calculating a difference in pixel index values for the paired shape intervals.

The disparity smoothing filter 270 smooths disparity offsets along a dimension perpendicular to that filtered by the image smoothing filter 230 to provide a smoothed disparity map. In one embodiment, the disparity smoothing filter 270 may select a range of pixels in both directions along the dimension on which the disparity smoothing filter 270 is operating and modify each pixel according to the mean, median, or mode of the disparity values of each pixel in the selected range.

The stereo vision apparatus 200 may include a gradient filter (not shown) that computes a difference between adjacent pixels of the left and right intensity profiles to provide left and right profile gradients for the row or column. A gradient filter may operate in conjunction with the shape determination module 250 to determine the range of matching pixels in a shape. The shape interval may be increased until the difference of gradients is greater or equal to an initial threshold. In one embodiment, the shape interval is extended beyond the initial threshold until a peak in the gradient is encountered. Use of the intensity gradient allows the shape determination module 250 to provide a correct disparity map, even if one of the images contains a constant offset of intensity values.

Figure 3:
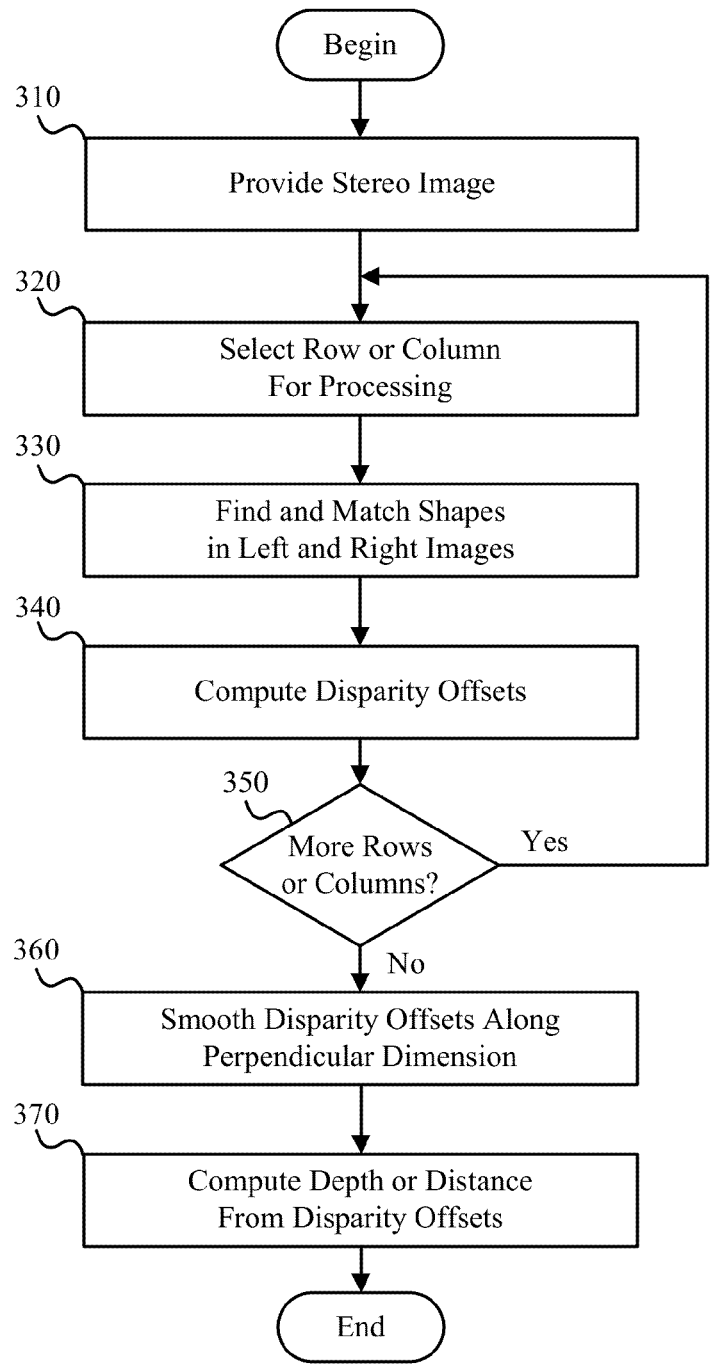
FIG. 3 is a flowchart diagram illustrating one embodiment of a stereo image processing method that is consistent with one or more embodiments of the claimed invention.

FIG. 3 is a flowchart diagram illustrating one embodiment of a stereo image processing method 300 of the claimed invention. As depicted, the stereo image processing method 300 includes providing (310) a stereo image, selecting (320) a row or column, finding and matching (330) shapes, computing (340) disparity offsets, smoothing (360) disparity offsets, and computing (370) a depth or distance.

Providing (310) a stereo image may include retrieving a stereo image comprising a left and a right image of a scene from a storage device or memory, or receiving a stereo image from a stereo digital camera or stereoscopic goggles, or the like. Selecting (320) a row or column may include selecting one row or column of pixels in the left and right images in which shapes are to be found and matched.

Figure 4:
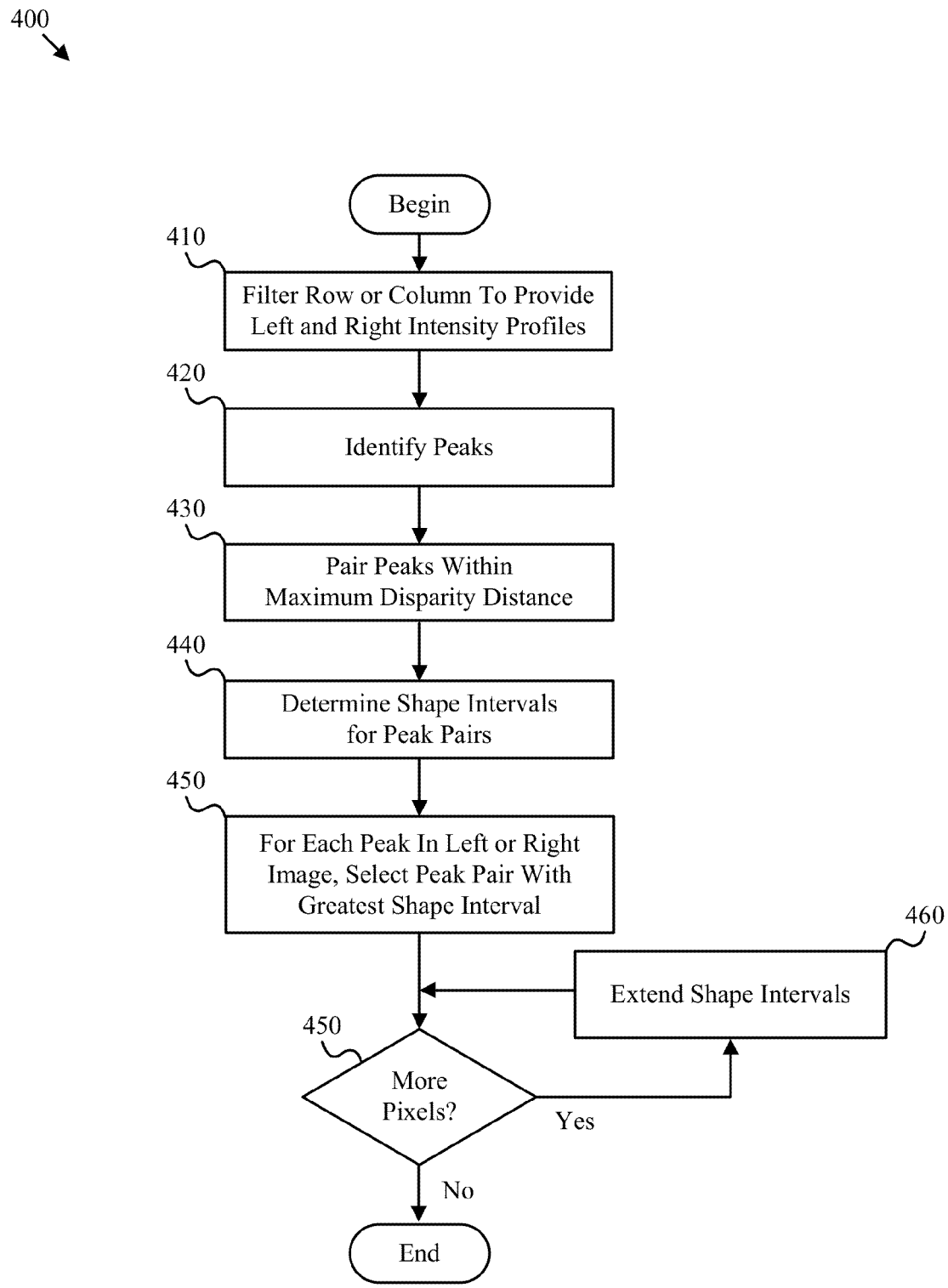
FIG. 4 is a flowchart diagram of one example of a shape matching method that is consistent with one or more embodiments of the claimed invention.

Finding and matching (330) shapes may include filtering the selected row or column to provide left and right intensity profiles, identifying left and right peaks within the intensity profiles, pairing the identified peaks, and identifying the interval of the intensity profile representing the complete shape. The shape matching method 400 depicted in FIG. 4 is one embodiment of a finding and matching shapes operation 330.

Computing (340) disparity offsets may include computing disparity offsets for the selected row or column in the left and right images to provide a disparity offset vector for that row or column. The disparity offset vectors for each row or column may be accumulated to form an unsmoothed disparity map.

Smoothing (360) disparity offsets may include smoothing the disparity offsets (i.e. map) along a perpendicular image dimension. Each pixel along the perpendicular dimension may be selected, along with a disparity window including a range of adjacent pixels and a normalizing adjustment applied to the selected pixel value to produce a smoothed disparity map. For example, smoothing the disparity values may include determining a most frequent disparity value within the disparity window. In another embodiment, smoothing the disparity values includes determining a median disparity value within the disparity window.

Computing (370) a depth or distance may include computing a depth or distance from a disparity offset by comparing the distance between the stereo image sensors with the disparity offset. In one embodiment, trigonometric functions are applied to calculate the distance between the image sensors and shapes corresponding to objects in the stereo images.

FIG. 4 is a flowchart diagram of one example of a shape matching method 400 that is consistent with one or more embodiments of the claimed invention. The shape matching method 400 may include filtering (410) a stereo image, identifying (420) peaks, pairing (430) peaks, determining (440) shape intervals, selecting (450) peak pairs, and extending (460) shape intervals. The shape matching method 400 may be used in conjunction with the find and match (330) shapes operation of the stereo image processing method 300 to match shapes in the left and right images of a stereo image.

Filtering (410) a stereo image may include filtering a row or column in the left and right images to provide left and right intensity profiles. The filter may be a Gaussian filter. Filtering the intensity profiles increases shape matching accuracy by reducing data noise.

Identifying (420) peaks may include identifying local maxima in the graphs of the intensity profiles. In one embodiment, a first derivative test is used to identify peaks in the intensity profiles. Pairing (430) peaks may include identifying peaks in the right image that are within a maximum disparity distance of a peak in the left image or vice versa. Pairing (430) peaks may include pairing peaks that are within a maximum disparity distance to provide peak pairs. The maximum disparity distance may be calculated based on the known distance between the stereo image sensors and an estimate of the minimum distance between the image sensors and objects in the stereo image.

Determining (440) shape intervals may include identifying an interval of matching pixels adjacent to peak pairs. Pixels may be matched by comparing a gradient difference in the intensity profiles near each peak. If the gradient difference is less than a selected threshold, the interval may be increased to encompass the compared pixels. In one embodiment the gradient difference comparison conforms to the equation:

$$[I_L(x)-I_L(x-1)]-[I_R(x+d)-I_R(x+d-1)] < \text{threshold} \quad (1),$$

where x is a pixel position within a row or column, d is an distance between peak pairs in the left and right images, $I_L$ is the intensity profile of the row or column in the left image and $I_R$ is the intensity profile of the row or column in the right image. While the gradient difference conforms to equation 1, a shape interval associated with the compared peak pair may be increased to encompass additional pixels.

Selecting (450) peak pairs may include pairing left and right shape intervals that have a maximum shape interval to provide paired shape intervals for the row or column.

Extending (460) shape intervals may include increasing the threshold associated with equation (1) and computing a gradient difference between adjacent pixels of left and right intensity profiles in order to match and encompass more pixels within each paired shape interval. Pixels may be encompassed until no unmatched pixels remain within the row or column.

FIGS. 5a, 5b, 5c, 5d, and 5e are graphical representations of operations performed by one embodiment of the shape matching method 400 of the claimed invention.

Figure 5A:
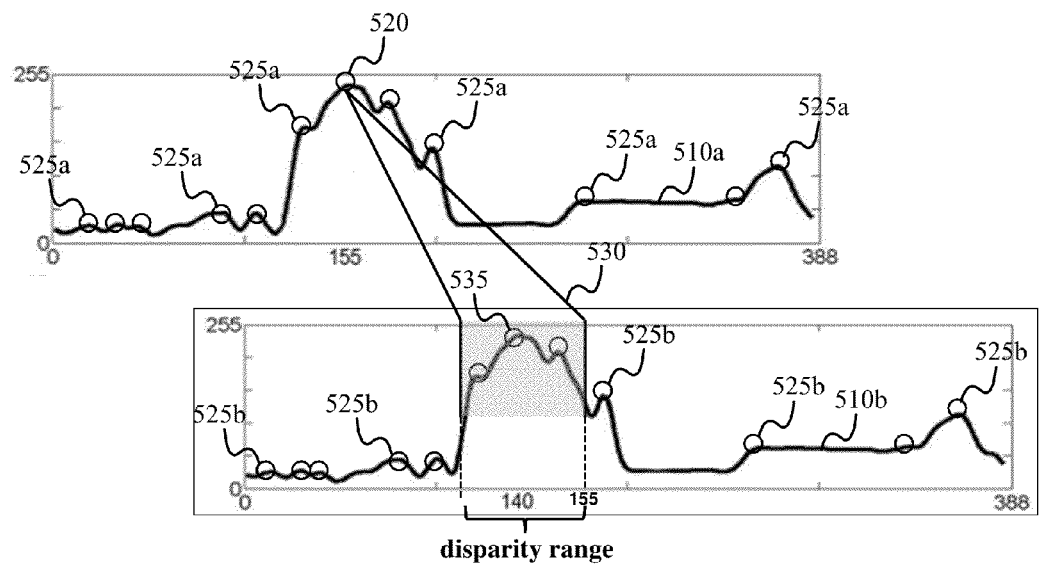
FIGS. 5*a*, 5*b*, 5*c*, 5*d*, and 5*e* are graphical representations of operations performed by one embodiment of a shape matching method of the claimed invention.

FIG. 5a depicts peaks 525a and 525b in left and right intensity profiles 510a and 510b. As depicted in FIG. 5a, peaks 520, 535, 525a, and 525b have been identified in the left intensity profile 510a and the right intensity profile 510b, in accordance with the identifying (420) peaks operation. The most prominent peak 520 in the left image and peaks in the right image within a maximum disparity range 530 have been selected in accordance with the pairing (340) peaks operation.

Figure 5B:
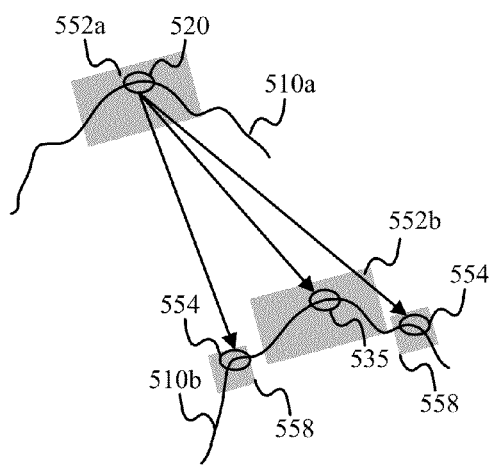

FIG. 5b depicts the operation of determining (440) shape intervals for each peak pair, and selecting (450) peak pairs with the maximum interval to provide paired shape intervals for the row or column. Shape interval 552a corresponding to peak 520 in the left intensity profile 510a has maximum matching interval with shape interval 552b corresponding to peak 535 in the right intensity profile 510b. Smaller matching intervals are found with shape intervals 558, corresponding to the peaks 554.

Figure 5C:
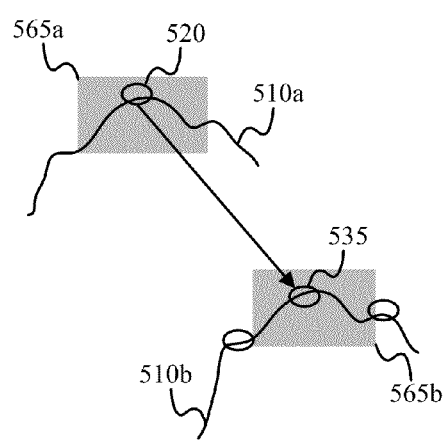
Figure 5D:
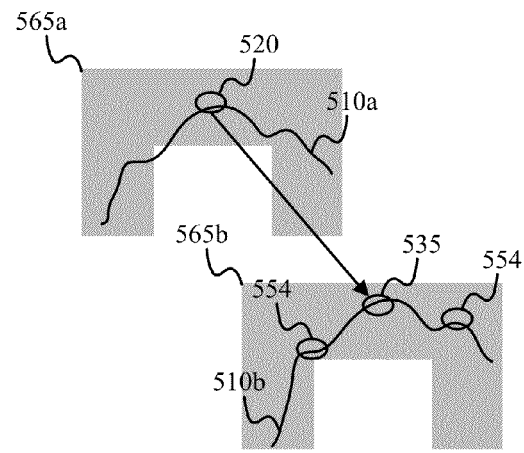
Figure 5E:
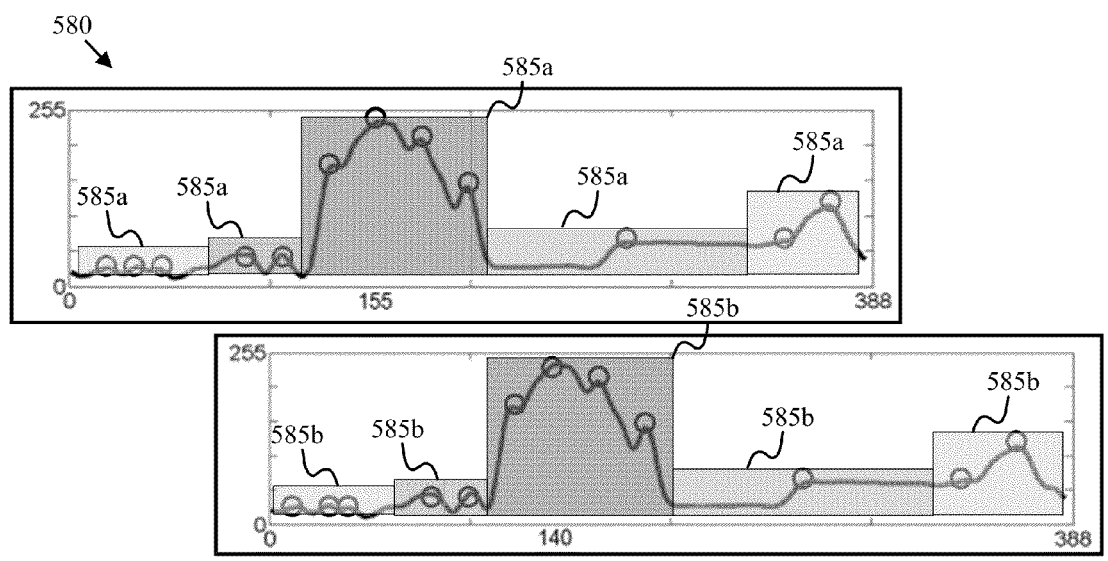

FIGS. 5c, 5d, and 5e depict the operations of extending (460) shape intervals by increasing the gradient difference threshold of equation (1) and thereby the width of each shape interval until the profile gradient exceeds the selected gradient difference threshold. The width of shape intervals 565a and 565b are consequently increased in FIG. 5d to include the shape interval corresponding to the shape of an object in the stereo images. The operations are repeated until all corresponding shape regions 585a and 585b have been identified.

Figure 6:
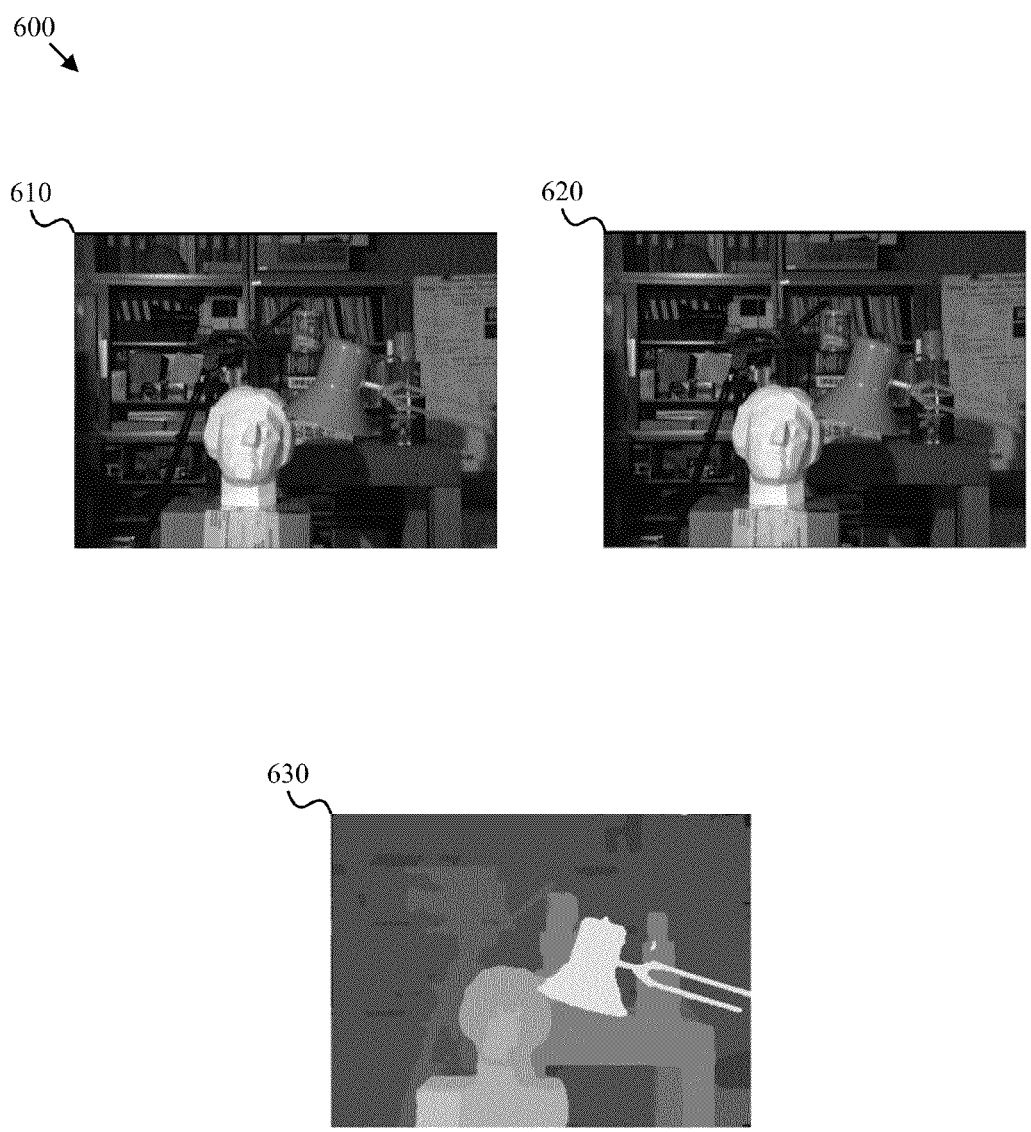
FIG. 6 is a block diagram depicting stereo image disparity regions as calculated by one or more embodiments of the claimed invention.

FIG. 6 is a block diagram depicting stereo image disparity regions 600 as calculated by one embodiment of a shape matching method 400 of the claimed invention. As depicted, the stereo image disparity regions 600 include a left stereo image 610, a right stereo image 620, and a disparity map 630. The disparity map 630 identifies areas of the stereo images corresponding to shapes of objects in the images. Shapes with greater disparity correspond to regions of higher intensity.

The various elements of the apparatus and methods presented herein function cooperatively to facilitate productive stereo image processing. The preceding depiction of the shape matching method 400 and other inventive elements described herein are intended to be illustrative rather than definitive. Similarly, the claimed invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for efficiently extracting depth information from a stereo image, the method comprising a plurality of operations including:
    providing a stereo image comprising a left and a right image of a scene;
    filtering a row or column in the left and right images to provide a left and a right intensity profile for the row or column, the row or column corresponding to a first image dimension;
    identifying peaks in the left and right intensity profiles to provide identified left peaks and identified right peaks;
    pairing left and right peaks that are within a maximum disparity distance to provide peak pairs;
    determining a shape interval for each peak pair by computing a difference between adjacent pixels along the first image dimension in a profile for the row or column to provide a profile gradient for the row or column, and advancing an end offset from each peak and retreating a start offset from each peak until a gradient difference between the left and right images at the start offset and the end offset exceeds a selected gradient difference threshold;
    selecting a peak pair with a maximum shape interval for each left peak or each right peak to provide selected peak pairs; and
    determining a disparity offset for the selected peak pairs.

2. The method of claim 1, further comprising extending the shape intervals for the selected peak pairs until all pixels within the row or column reside within a shape interval of a selected peak pair.

3. The method of claim 2, wherein the operations of filtering, identifying, pairing, determining a shape interval and selecting are conducted for each row or column of the stereo image.

4. The method of claim 3, further comprising computing disparity offsets for each row or column in the left and right image to provide a disparity map for the stereo image.

5. The method of claim 4, further comprising computing a depth or distance from a disparity offset.

6. The method of claim 4, further comprising smoothing the disparity offsets along a second image dimension that is perpendicular to the first image dimension to provide a smoothed disparity map.

7. The method of claim 6, wherein smoothing the disparity values comprises determining a most frequent disparity value within a disparity window.

8. The method of claim 6, wherein smoothing the disparity values comprises determining a median disparity value within a disparity window.

9. The method of claim 8, further comprising increasing the selected gradient difference threshold to extend the shape intervals.

10. An apparatus for efficiently extracting depth information from a stereo image, the apparatus comprising:
    a memory configured to store a stereo image comprising a left and a right image of a scene;
    an image smoothing filter configured to filter a row or column in the left and right images to provide a left and a right intensity profile for the row or column, the row or column corresponding to a first image dimension;
    a peak finding module configured to identify peaks in the left and right intensity profiles to provide identified left peaks and identified right peaks;
    a shape determination module configured to pair identified left and right peaks that are within a maximum disparity distance to provide peak pairs;
    the shape determination module configured to determine a shape interval for each peak pair;
    the shape determination module configured to select a peak pair with a maximum shape interval for each left peak or each right peak to provide selected peak pairs by computing a difference between adjacent pixels along the first image dimension in a profile for the row or column to provide a profile gradient for the row or column, and advancing an end offset from each peak and retreating a start offset from each peak until a gradient difference between the left and right images at the start offset and the end offset exceeds a selected gradient difference threshold; and
    a disparity determination module configured to determine a disparity offset for each selected peak pair.

11. The apparatus of claim 10, wherein the shape determination module is further configured to extend the shape intervals for the selected peak pairs until all pixels within the row or column reside within a shape interval of a selected peak pair.

12. The apparatus of claim 11, wherein the image smoothing filter, peak finding module, shape determination module, and disparity determination module are configured to operate on each row or column of the stereo image.

13. The apparatus of claim 12, further comprising a disparity smoothing filter configured to smooth the disparity offsets along a second image dimension that is perpendicular to the first image dimension to provide a smoothed disparity map.

14. The apparatus of claim 13, wherein the disparity smoothing filter determines a most frequent disparity value within a disparity window.

15. The apparatus of claim 13, wherein the disparity smoothing filter determines a median disparity value within a disparity window.

16. A method for determining shapes within a stereo image, the method comprising a plurality of operations including:
   providing a stereo image comprising a left and a right image of a scene containing a plurality of shapes;
   filtering a row or column in the left and right images to provide a left and a right intensity profile for the row or column, the row or column corresponding to a first image dimension;
   identifying peaks in the left and right intensity profiles to provide identified left peaks and identified right peaks;
   pairing left and right peaks that are within a maximum disparity distance to provide peak pairs, each peak pair corresponding to a shape in the plurality of shapes in the stereo image;
   determining a shape interval for each peak pair by advancing an end offset from each peak and retreating a start offset from each peak until a gradient difference between the left and right images exceeds a selected gradient difference threshold; and
   selecting a peak pair with a maximum shape interval for each left peak or each right peak to provide detected shape intervals for the plurality of shapes in the stereo image.

17. An apparatus for determining shapes within a stereo image, the apparatus comprising:
   a memory configured to store a stereo image comprising a left and a right image of a scene containing a plurality of shapes;
   an image smoothing filter configured to filter a row or column in the left and right images to provide a left and a right intensity profile for the row or column, the row or column corresponding to a first image dimension;
   a peak finding module configured to identify peaks in the left and right intensity profiles to provide identified left peaks and identified right peaks;
   a shape determination module configured to pair identified left and right peaks that are within a maximum disparity distance to provide peak pairs, each peak pair corresponding to a shape in the plurality of shapes in the stereo image; and
   the shape determination module configured to determine a shape interval for each peak pair by advancing an end offset from each peak and retreating a start offset from each peak until a gradient difference between the left and right images exceeds a selected gradient difference threshold; and
   the shape determination module configured to select a peak pair with a maximum shape interval for each left peak or each right peak to provide detected shape intervals for the plurality of shapes in the stereo image.

* * * * *